Nov. 21, 1967  A. LANDY, JR., ET AL  3,354,366
PULSE TORQUE CONTROL APPARATUS
Original Filed April 6, 1962  2 Sheets-Sheet 2

INVENTOR.
ARNEY LANDY, JR.
TENNY D. LODE
BY
Roger W. Jensen
ATTORNEY.

3,354,366
PULSE TORQUE CONTROL APPARATUS
Arney Landy, Jr., Roseville, and Tenny D. Lode, Edina, Minn., assignors to Honeywell Inc., a corporation of Delaware
Continuation of application Ser. No. 185,623, Apr. 6, 1962. This application Aug. 22, 1966, Ser. No. 574,246
8 Claims. (Cl. 318—18)

ABSTRACT OF THE DISCLOSURE

This application discloses a pulse torquer for inertial instruments wherein a digitally controlled switching bridge causes energization pulses to be applied to the torquer in a plus or minus direction. When the torquer is at or near null, alternate plus and minus pulses are applied.

Cross-reference to related application

Figure 1:
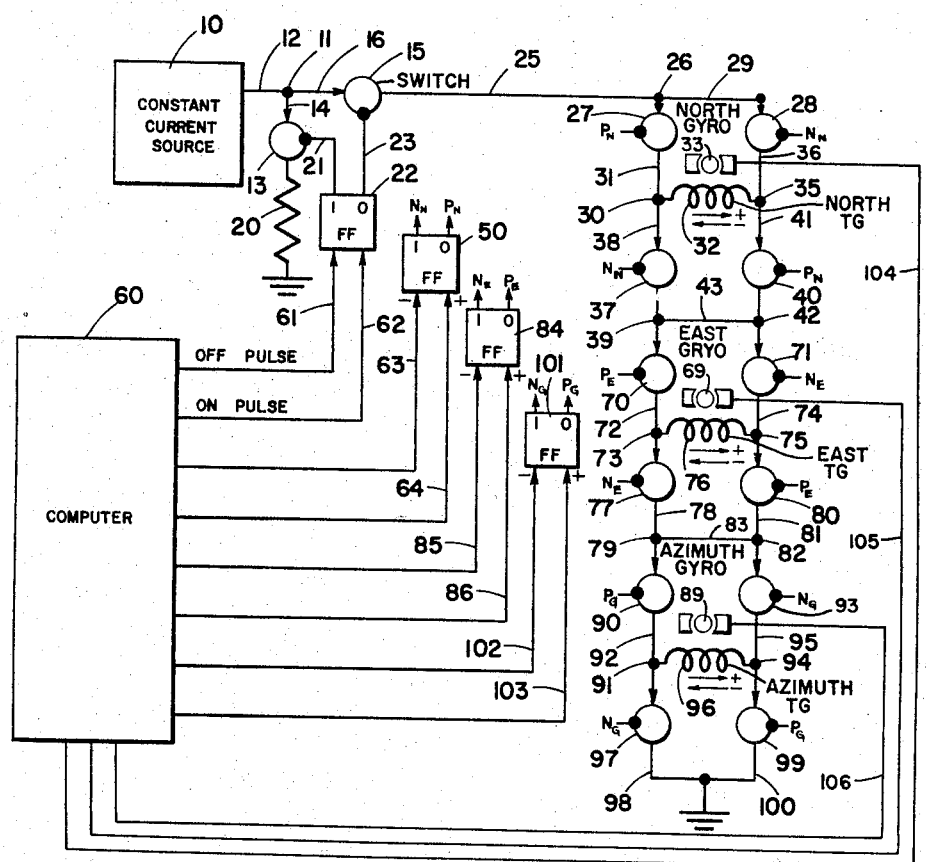

This application is a continuation of our copending application, Ser. No. 185,623, filed Apr. 6, 1962, now abandoned.

The invention

This invention relates to apparatus for energizing a force producing means and more specifically to apparatus for continuously pulsing force producing means.

Prior art devices which utilize pulses of power to energize force producing means such as torque generators or rebalancing means of devices such as sensitive gyros and accelerometers and the like usually apply the pulses to the force producing means only when it is desired to obtain a force. This type of device is commonly known as a pulse on demand device. To illustrate the operation of this device assume that it is desired to maintain a gyro, having a torque generator and a signal generator, in some relative position. If the gyro leaves this relative position the signal generator produces a signal which is applied to a pulse generator and the pulse generator produces pulses of the proper polarity which when applied to the torque generator winding cause the gyro to assume its relative position.

In some of the more sophisticated prior art devices when the gyro was at a null position, or in the position at which it was desired to maintain it, the pulses from the pulse supply were applied to a dummy load. The dummy load is an impedance which is as similar to the impedance of the torque generator winding as is practical. When the pulse supply is switched from the dummy load to the torque generator winding, slight changes in the pulses occur due to the change in load across the pulse supply. Since the dummy load cannot be made exactly the same impedance as the torque generator winding the load of the pulse supply will always change when switching from one to the other. Because the accuracy of this device is dependent upon the exactness with which all of the pulses may be produced equal, these changes in pulses due to changes in the load may cause a large variation in accuracy. Also, the switching means is of necessity quite complicated to accomplish the switching from the dummy load to the torque generator in the correct polarity and for the correct length of time.

In the present invention an energization source, which may be a constant current source or a constant pulse source, is connected to some force producing means such as the torque generator of a gyro by a switching means. The switching means may be comprised of some type of solid state switches or some type of mechanical switches depending upon the use of the device and the speed with which the switching must be done. If the constant current source is used the switching means alternately connects the current source across the torque generator winding, first in one polarity and then in the other while the gyro is at the null position. The switching means operates at predetermined increments of time, and current is flowing in one direction or the other through the torque generator winding at all times that the switch is not opertaing but flows through a closely matched dummy load at times that the switch is operating. Thus, pulses of current are flowing through the torque generator winding at all times, regardless of the position of the gyro. If the gyro moves off the null position the switching means connects the current source to the torque generator winding in the same polarity in each switching cycle until the gyro moves back to the null position, at which time the switching means again begins to connect the current source alternately plus and minus. Since the constant current source is connected to the dummy load for a constant amount of time during each cycle the dummy load has the same effect on each pulse and its effect becomes a constant which may be practically removed. Thus, the adverse influence which the dummy load has upon the torquing accuracy is greatly reduced.

If a constant pulse supply is utilized in place of a constant current source the dummy load may be eliminated completely from the circuit. To insure that large values of currents are not being switched, with the resulting bad effects that this produces, the switching is accomplished between pulses. That is, when the gyro is at the null position the switching means is alternately applying pulses of opposite polarity and the switching means operates as each pulse comes back to zero. If the gyro moves off of the null position in one direction or the other the switching means applies a series of positive or negative pulses to the torque generator winding until the gyro is torqued back to the null position at which time the switching means again applies alternately positive and negative pulses.

Thus, it can be seen that the present device has substantially eliminated the adverse effects which the dummy load has upon the accuracy of the torque generator and it has greatly simplified the switching means. Also, by applying continuous plus and minus pulses to the torque generator winding when the gyro is at the null position a dithering effect is obtained which greatly reduces errors due to null uncertaintities and residual magnetism as well as reducing thresholds.

It is a primary object of this invention to provide an improved control apparatus.

It is a further object of this invention to provide a new and improved means for energizing force producing means.

It is a further object of this invention to provide a simpler and more accurate apparatus for energizing such devices as torque generators of gyros.

Figure 2:
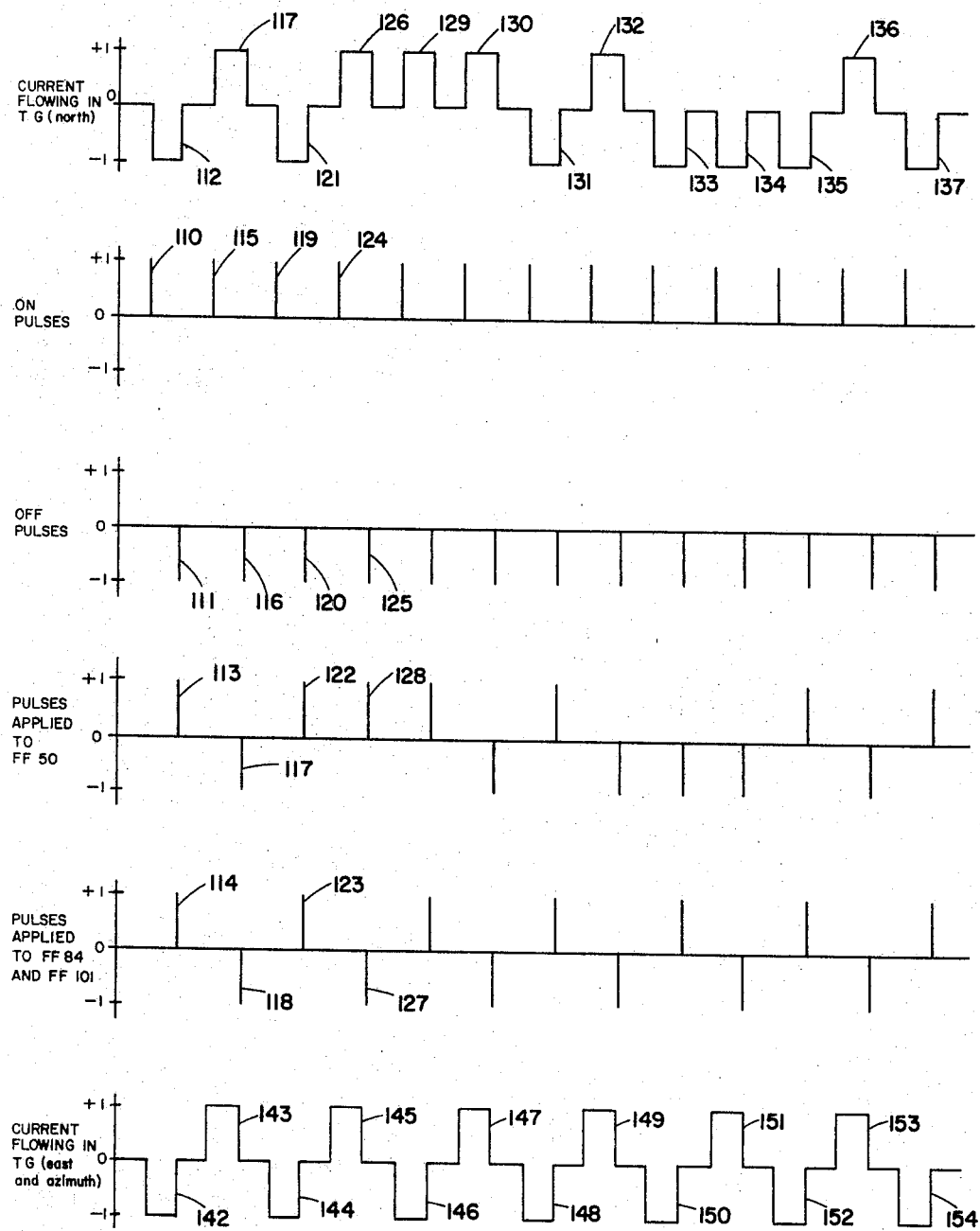

These and other objects of this invention will become apparent from the following description of a preferred form thereof in the accompanying specification, claims, and drawing, of which:

FIGURE 1 is a block diagram of the present apparatus;
FIGURE 2 is a diagram of the pulses present within the apparatus; and
FIGURE 3 is an alternate embodiment of the present apparatus.

In FIGURE 1 the output of a constant current source 10 is connected to a junction point 11 by means of a lead 12. A switch 13 is connected to junction point 11 by means of a lead 14 and a switch 15 is connected to junction point 11 by means of a lead 16. Switch 13, when closed, connects one side of an impedance 20 to junction point 11 and the other side of impedance 20 is connected to ground. The activation of switch 13 is controlled by a signal which is supplied to the switch by means of a lead 21 connected at the other end to a bistable flip-flop circuit 22. The activation of switch 15 is controlled by a signal applied to the switch by means of a lead 23, which is connected at the other end to the opposite level of flip-flop 22 to that of lead 21. That is, when the signal on lead 21 and, therefore, switch 13 is an ON signal the signal on lead 23 and, therefore, switch 15 is an OFF signal. Switch 15 when activated connects lead 16 to a lead 25 which has the opposite end connected to a junction point 26. Junction point 26 is connected directly to a first switch 27 and to a second switch 28 by means of a lead 29. Switch 27, when activated, connects junction point 26 to a junction point 30 by means of a lead 31. Switch 28, when activated, connects lead 29 to a lead 36 which is connected to a second junction point 35. Connected between junction point 30 and junction point 35 is a torque generator winding 32 for a sensitive device such as a gyro or accelerometer, which is shown schematically as a north gyro 33. It should be noted that the winding 32 could represent any force producing means and the torque generator has simply been chosen for simplicity in explanation. Also, to show one possible utilization of the present invention the torque generator will be assumed to be the torque generator of the north gyro on a stable platform. Another switch 37 is connected to junction point 30 by means of a lead 38. When activated, switch 37 connects lead 38 to a junction point 39. Another switch 40 is connected to junction point 35 by means of a lead 41. When activated, switch 40 connects lead 41 to a junction point 42. Junction points 39 and 42 are connected together by means of a lead 43.

Switch 27 is activated by means of a signal which is applied on a lead designated $P_n$. In this particular embodiment of the invention $P_n$ stands for positive north and simply means that when a positive torquing of the north gyro is desired this switch is closed. The lead $P_n$ connected to switch 27 is actually a continuation of a lead $P_n$ shown attached to a bistable flip-flop 50. Several of the leads have only the end connections shown to reduce confusion in FIGURE 1. However, it should be remembered that the leads having similar letters are in actuality connected together. Thus, the activation of switch 27 is actually controlled by bistable flip-flop 50. Switch 40 is also activated by a signal which is applied by means of a lead designated $P_n$. This signal is obtained from the same point on flip-flop 50 as the signal which activates switch 27. Switch 28 is activated by a signal which is applied by means of a lead $N_n$. Switch 37 is also activated by a signal which is applied by means of a lead $N_n$. The leads $N_n$ connected to switches 28 and 37 are extensions of the lead $N_n$ shown connected to flip-flop 50. Since flip-flop 50 is a bistable device it has two positions a which it may stop. In the first position a signal is applied to lead $N_n$ which acivates switches 28 and 37. When flip-flop 50 is in the second position a signal is applied to the lead $P_n$ and this signal activates switches 27 and 40.

A suitable computer 60 provides one input for bistable flip-flop 22 on a lead 61 and the other input on a lead 62. Computer 60 also provides a first input for bistable flip-flop 50 on a lead 63 and a second input for flip-flop 50 on a lead 64. Computer 60 may be some simple type of digital computer which applies a steady train of pulses that alternate between leads 61 and 62 to cause flip-flop 22 to operate at a specific frequency. Computer 60 will also apply a steady train of pulses to flip-flop 50 which alternate between leads 63 and 64 when the north gyro is at the null position. As explained more fully later, these pulses on flip-flop 50 will cause the current from source 10 to flow through the north gyro torque generator winding 32 in alternate directions which cause the gyro to dither or oscillate slightly about the null position. If the north gyro moved from the null position in a positive direction or sense computer 60 would apply a pulse to flip-flop 50 on lead 63 causing flip-flop 50 to produce an output on lead $N_n$ which is applied to switches 28 and 37. When a signal is applied to lead $N_n$ switches 28 and 37 are activated, or closed, which connects the torque generator winding 32 to the current source 10 in a first orientation and, assuming (for the moment) that lead 43 is grounded, current will flow from constant current source 10 through switch 28, torque generator 32 as shown by the arrow marked with a (—) sign, switch 37, and to ground each time switch 15 is activated by a pulse from flip-flop 22.

If the north gyro should move from the null position in a negative direction or sense, computer 60 would apply a pulse to flip-flop 50 on lead 64. This pulse would cause flip-flop 50 to produce a signal on lead $P_n$ which would be applied to switches 27 and 40. The signal on lead $P_n$ would activate or close switches 27 and 40, which would connect the torque generator winding 32 to the current source 10 in a second orientation, and allow current to flow from the constant current source 10 through switch 27, torque generator 32 in the opposite direction, as shown by the arrow marked with a (+) sign, and switch 40 to ground. It should be noted that again this current will only flow at the times when switch 15 is activated by pulses from flip-flop 22. When a signal is applied to lead $P_n$ to activate switches 27 and 40 the lead $N_n$ has a signal to deactivate switches 28 and 37, or in some apparatus no signal at all may cause these switches to open.

In a similar manner, flip-flop 22 causes switch 13 to open when switch 15 is closed and switch 15 to open when switch 13 is closed. The pulses from computer 60 should be so timed that when flip-flop 50 is activating switches to change the direction of the current flow through torque generator 32 from a positive to a negative direction or from a negative to a positive direction switch 15 is opened and switch 13 is closed, thus, allowing the current from the constant source to flow through impedance 20. This can easily be accomplished by applying the OFF pulses, which are applied to flip-flop 22 on lead 61, to either lead 63 or lead 64 depending upon the direction which it is desired to torque the gyro. These OFF pulses could be applied to either lead 63 or lead 64 by means of a switch which could be controlled by the signal generator of the north gyro. Thus, when the signal generator of the north gyro indicated that the gyro had moved in a negative direction the OFF pulses could be applied to lead 64 and, conversely, when the signal generator of the north gyro indicated that the gyro had moved in a positive direction the switch could be controlled to apply the OFF pulses to lead 63. A configuration similar to the above would be utilized in strapped-down systems or where the gyro is to measure the angular rate of a device and is solidly attached to that device. It should be noted that this pulse torquing device might also be used in such systems as inertial platforms, in which case, the gyro signal generator is attached to a synchro on one of the gimbals of the platform and the input to the computer 60 would come from outputs of accelerometers on the platform. The computer controlled pulse train would then be used to position the platform by the gyro loop. No detail has been shown in computer 60 since the components required would depend strictly upon the utilization of the present invention and as many different configurations could be thought of by one skilled in the art as different uses of the present device.

To connect an east gyro to the present device a switch 70 is connected directly to junction point 39 and a switch 71 is connected directly to a junction point 42. Switch 70 when activated connects junction point 39 to a junction point 73 by means of a lead 72. Switch 71 when activated connects junction point 42 to a junction point 75 by means of a lead 74. The torque generator winding 76 of an east gyro is connected between junction points 73 and 75. An east gyro is shown schematically at 69. A switch 77 is connected directly to junction point 73 and when activated connects junction point 73 to a junction point 79 by means of a lead 78. A switch 80 is connected directly to junction point 75 and when activated connects junction point 75 to a junction point 82 by means of a lead 81. Junction point 79 and junction point 82 are connected together by means of a lead 83.

Switch 70 is activated by means of a signal applied on a lead $P_e$. The other end of lead $P_e$ is connected to a bistable flip-flop 84. As previously explained for leads $N_n$ and $P_n$, only the ends of lead $P_e$ are shown. Switch 80 is also activated by a signal which is applied on lead $P_e$. Switch 71 is activated by a signal which is applied on a lead $N_e$, the other end of the lead $N_e$ is attached to bistable flip-flop 84. Switch 77 is also activated by a signal on lead $N_e$. As previously explained in relation to the north gyro, the letters $P_e$ stand for positive east and the letters $N_e$ stand for negative east. These letters are utilized to further clarify the operation of the present device. Computer 60 controls bistable flip-flop 84 to a negative position by means of a signal on a lead 85 or to a positive position by means of a signal on a lead 86.

A third or azimuth gyro torque generator may be connected in series with the north and east torque generators in the following manner. A switch 90 is connected directly to junction point 79 and when activated connects junction point 79 to a junction point 91 by means of a lead 92. A switch 93 is connected directly to junction point 82 and when activated connects junction point 82 to a junction point 94 by means of a lead 95. A torque generator winding 96 of an azimuth gyro is connected between junction points 91 and 94. An azimuth gyro is shown schematically at 89. A switch 97 is connected directly to junction point 91 and when activated grounds junction point 91 through a lead 98. A switch 99 is connected directly to junction point 94 and when activated grounds junction point 94 through a lead 100.

Switch 90 is activated by means of a signal applied to a lead $P_g$. The other end of lead $P_g$ is connected to a bistable flip-flop 101. Switch 99 is also activated by means of a signal on lead $P_g$. Switches 93 and 97 are activated by means of a signal on a lead $N_g$, the other end of which is connected to flip-flop 101. As already explained, to simplify FIGURE 1 only the end connections of leads $P_g$ and $N_g$ are shown. Flip-flop 101 is controlled to a negative position by means of a signal applied to an input 102 thereof by computer 60. Flip-flop 101 is controlled to a positive position by means of a signal applied to another input lead 103 thereof by computer 60. Flip-flop 101 acts similar to flip-flops 84 and 50. That is, when a pulse is applied to the positive input lead 103 by computer 60 the flip-flop is controlled to a position whereby it applies an activating signal to the positive output lead and a deactivating signal to the negative output lead. When a signal is applied to the negative input lead 102 by computer 60 an activating signal is applied to the negative output lead and a deactivating signal is applied to the positive output lead.

The north gyro 33, the east gyro 69, and the azimuth gyro 89 provide signals on leads 104, 105, and 106, respectively, which are coupled to computer 60. Computer 60 operates in accordance with these signals in applying switching signals to flip-flops 50, 84, and 101.

OPERATION

To demonstrate the operation of the present device it will first be assumed that the north, east and azimuth gyros are all at their null positions. In FIGURE 2 a series of pulses labeled ON pulses is shown and this series of pulses is applied to lead 62 of flip-flop 22 by computer 60. Similarly, a series of pulses labeled OFF pulses also depicted in FIGURE 2 will be applied to lead 61 of flip-flop 22 by computer 60. Also, in FIGURE 2, the series of square pulses labeled "current flowing in $T_G$ (north)" are the pulses of current flowing through the north torque generator winding 32 as measured from junction point 30 to junction point 35 and the series of square pulses labeled "current flowing in $T_G$ (east and azimuth)" are the pulses of current flowing through the east and azimuth torque generator windings 76 and 96 as measured from points 73 to 75 and 91 to 94, respectively. It should be noted that the east and azimuth gyros are shown singly to demonstrate their connection in the circuit and that in this explanation they will be assumed to remain at null. Thus, the same current waveform may be used to illustrate the current through both torque windings.

Assume that flip-flop 50 is in the negative position, that is, an activating signal is on the lead $N_n$ and switches 28 and 37 are closed while a deactivating signal is on the lead $P_n$ and the switches 27 and 40 are open. When computer 60 applies ON pulses 110 to lead 62 flip-flop 22 applies an activating signal to switch 15 and a deactivating signal to switch 13. Assuming that switches 71, 77, 93 and 97 are activated in a similar manner to switches 28 and 37, when switch 15 closes a pulse of current will flow through the north torque generator winding 32 from switch 28 to switch 37, through the east torque generator winding 76 from switch 71 to switch 77 and through the azimuth torque generator winding 96 from switch 93 to switch 97. Some specified time later computer 60 applies an OFF pulse 111 to lead 61 which switches flip-flop 22 deactivating switch 15 and activating switch 13. The deactivation of switch 15 stops the current from flowing through the torque generator circuit and the activation of switch 13 causes the current to flow down through the dummy load 20. The waveform of the current which is flowing through north torque generator winding 32 is represented by the square pulse 112 in FIGURE 2 and the current flowing through the east and azimuth torque generator windings 76 and 96, respectively, is represented by the square pulse 142.

If the OFF pulse 111 from the computer 60 is applied to lead 64, lead 86 and lead 103 at the same time that it is applied to lead 61, as indicated by pulses 113 and 114, all of the positive or P leads will have activating signals on them while all of the negative or N leads will have deactivating signals on them. Thus, when the next ON pulse 115 is applied to lead 62 and flip-flop 22 activates switch 15 and deactivates switch 13, current will flow from the constant current source through the north torque generator winding 32 from switch 27 to switch 40, through the east torque generator winding 76 from switch 70 to switch 80 and through the azimuth torque generator winding 96 from switch 90 to 99. This current through the torque generator windings is continuous until some time later when an OFF pulse 116 is applied to lead 61 causing flip-flop 22 to apply a deactivation signal to switch 15 and an activating signal to switch 13. Thus, the current flowing through the north torque generator winding 32 is represented by the positive square pulse 117 and the current flowing through the east and azimuth torque generator windings 76 and 96, respectively is represented by the square pulse 143.

At the same time that OFF pulse 116 is applied to lead 61 by computer 60 the same pulse would be applied to lead 63, lead 85, and lead 102, as represented by pulses 117 and 118 in FIGURE 2. These pulses applied to flip-flops 50, 84 and 101 would cause the flip-flops to apply an activation signal to the N leads and a deactivation to the P leads. Thus, when the next ON pulse 119 was applied to lead 62 to activate switch 15 the current from the constant current source 10 would flow through the torque generator windings in a negative direction until the next OFF pulse 120 was applied to lead 61 and flip-flop 22 deactivated switch 15. The current flowing through the north torque generator winding 32 would produce a negative square pulse as represented by pulse 121 and the current flowing through the east and azimuth torque generator windings 76 and 96 is represented by pulse 144.

As can be seen in FIGURE 2, when the gyros are at the null position, alternate positive and negative pulses of current are applied to the torque generator windings which cause the gyros to dither or oscillate slightly about the null position. However, it should be noted that the time average of the torquing is zero and, hence, the gyro essentially remains at the null position. The dithering of the gyro greatly reduces null uncertainties and thresholds and is also greatly advantageous in that the switching is greatly simplified by allowing the pulses of current to flow through the torque generator windings continuously. The switch 13 and the dummy load 20 shunt the current from source 10 during the switching operations to reduce the adverse effects that occur when the current through the torque generator winding is quickly reversed. By connecting the dummy load 20 to the source 10 for a specified amount of time each cycle the effect which the dummy load 20 has on the source 10 is a constant and compensation can be introduced in the apparatus or in some cases the constant current source can monitor and, thus, regulate only the current flowing through the torque windings of the gyros and in these cases the dummy load would not have any effect on the regulation of the constant current source. Also, it is well known in the art that pulses of current produce a more linear torquing of the gyro than analog currents because the current amplitude is always the same in pulse torquing.

Assume now that the north gyro moves off the null position in the negative direction, but the east, and azimuth gyros remain at their respective null positions. The OFF pulse 120 which is applied to lead 61 by computer 60 is also applied to lead 64, lead 86, and lead 103 as represented by pulses 122 and 123. Thus, the flip-flops produce an activating signal on all of the P leads and a deactivating signal on all of the N leads. When the next ON pulse 124 is applied to lead 62 flip-flop 22 activates switch 15 and deactivates switch 13 and current is allowed to flow through the torque generator windings 32, 76 and 96 in a positive direction. When the next OFF pulse 125 is applied to lead 61 flip-flop 22 deactivates switch 15 and activates switch 13 stopping the current from constant current source 10 from flowing through the torque generator windings and shunting it through the dummy load 20. The positive square pulse of current through the north torque generator winding 32 is represented by square pulse 126 and the positive square pulse of current through the east and azimuth torque windings 76 and 96 is represented by the square pulse 145.

At the same time that OFF pulse 125 is applied to lead 61 the pulse is also applied to leads 85 and 102 as represented by pulse 127. However, since the north gyro is still off null in a negative direction the OFF pulse is applied to the positive lead 64 of flip-flop 50. This is represented by pulse 128. Thus, while the current through the east torque generator winding 76 and the azimuth torque generator winding 96 is switched to flow in a negative direction the current through the north torque generator winding 32 is still traveling in a positive direction to torque the gyro back towards null. This second positive pulse of current through the north torque generator is represented by the positive square pulse 129 and the negative pulse though the east and azimuth torque generator windings 76 and 96 is represented by square pulse 146.

Assume that after another positive square pulse of current 130 is applied to the north torque generator winding 32 the north gyro again is at a null position and the current again begins to alternate through the north torque generator winding 32 as previously explained and as shown by square pulses 131, 132 and 133. If now the north gyro should move from the null position in a positive direction the pulses of current would continue to travel through the north torque generator winding 32 in a negative direction, as shown by pulses 134 and 135, to torque the gyro back to the null position. Once the gyro reached the null position the pulses would again alternate as shown by pulses 136 and 137. Meanwhile the east and azimuth gyros have remained at the null position and alternate positive and negative pulses 147 through 154 have been applied to torque windings 76 and 96. Thus, the east and azimuth gyros have been continually dithered about the null position. To produce current pulses 130 to 137 and 147 to 154 all of the flip-flops and switches are activated by pulses from the computer 60 as already explained and as shown in FIGURE 2.

The maximum amount of torque which any of the torque generators can produce occurs when all of the square pulses of current applied to the torque generator windings are applied in the same direction, and the amount of torque can be linearly decreased by decreasing the net number of pulses of current in that particular direction. The net number of pulses may be defined as the difference between the number of pulses of opposite polarity. When the number of pulses traveling through the torque generator winding in one direction is exactly equal to the number of pulses traveling through the torque generator winding in the other direction the torque generator will produce no net torque. However, since each pulse of current applied to the torque generator winding causes the torque generator to produce a small amount of torque when alternate positive and negative pulses are applied to the torque generator winding an alternative positive and negative torque will be produced which will cause the gyro to oscillate slightly or dither. This dither is advantageous in that it will reduce thresholds and null uncertainties in the gyro and torque generator, as well as reducing the average residual magnetism in the torque generator core.

Thus, the present invention is a highly accurate device utilizing a continuous train of pulses for energizing force producing means in that the size and, therefore, the consistency of the pulses applied to the force producing means is dictated by a separate pulse device which is not effected by the slight changes in load which occur when the dummy load is exchanged for the torque generator winding. Also, the device is simple to construct and has the added features that it reduces thresholds and null uncertainties as well as average residual magnetism in the core of the force producing means.

Another possible configuration which is within the scope of the present invention is to exchange the constant current source 10 with a constant pulse source 210 shown in FIGURE 3. In this embodiment the dummy load 20 and its associated circuitry, switch 13, switch 15, and flip-flop 22, may be eliminated. This can be accomplished by simply actuating switch 15 or by taking these components out of the circuit as shown in FIGURE 3. Then, if the flip-flops 50, 84 and 101 are triggered when the output of the constant pulse source is zero, the same effect will be obtained as described in the previous embodiment. As shown in FIGURE 3 constant pulse source 210 applies a series of constant pulses to a junction point 226 by means of a lead 212 and to a computer 260 by means of a lead 219. The computer 260 applies a pulse to a flip-flop 250 on either a negative lead 263 or a positive lead 264. The constant pulse source 210 is connected to computer 260 so that the computer will energize flip-flop 250 between pulses from source 210. A switch 227 is connected directly to junction point 226 and when activated connects junction point 226 to another junction point 230 by means of a lead 231. Another switch 228 is connected to junction point 226 by means of a lead 229 and when activated connects junction point 226 to another junction point 235 by means of a lead 236. A north gyro torque generator winding 232 is connected between junction points 230 and 235. Also, connected to junction point 230 by means of a lead 238 is a switch 237 and connected to junction point 235 by means of a lead 241 is a switch 240. Switch 237, when activated, connects lead 238 to ground by means of a lead 243 and switch 240, when activated, connects lead 241 to ground by means of lead 243. Switches 227, 228, 237 and 240 are connected to flip-flop 250 by $P_n$ and $N_n$ leads in the same manner as already explained for the previous embodiment. It should be noted that lead 243 is shown grounded and only the north torque generator winding is depicted for simplicity. The operation of this embodiment is similar to the embodiment previously described except that the dummy load 20 and its associated circuitry has been eliminated because a constant pulse supply 210 is utilized. In this embodiment the adverse effect which the dummy load has on the accuracy of the torquing is eliminated and the advantage of the dither produced by the torque generator are still prevalent.

While we have shown and described a preferred embodiment of this invention, further modifications and improvements will occur to those skilled in the art. We desire it to be understood, therefore, that this invention is not limited to the particular form shown and we intend in the appended claims to cover all modifications which do not depart from the spirit and scope of this invention.

We claim:

1. Apparatus for energizing reversible force producing means comprising, in combination: an energization source for providing pulses of substantially constant energy content; switching means; and control means connected to said switching means for operating said switching means for periodically connecting said energization source to the force producing means in a first orientation when a first sense of force is desired so that said pulses are applied to said force producing means in a first sense, in a second orientation when a second sense of force is desired so that said pulses are applied to said force producing means in a second sense, and alternately in the first and second orientations when substantially no force is desired so that said pulses are alternately applied to said force producing means in the first and second senses.

2. Apparatus for substantially rebalancing the movable member of an inertial sensor comprising, in combination: reversible force producing means connected in an operable relationship with the inertial sensor; means for supplying energization pulses, each pulse having substantially constant energy content; switching means for connecting said means for supplying energization pulses to said force producing means, said connection being in a first orientation when a first direction of movement of the movable member is desired so that the energization pulses are applied to said force producing means in a first sense only, in a second orientation when a second direction of movement of the movable member is desired so that the energization pulses are applied to said force producing means in the second sense only, and alternately in the first orientation and then in the second orientation when substantially no movement of the movable member is desired so that the pulses are alternately applied to said force producing means in the first and second senses; and means connected to the switching means for selectively activating said switching means to connect the means for supplying energization pulses to the force producing means in the desired orientation.

3. Apparatus as defined in claim 2 in which the means for supplying energization pulses includes a constant current source, a dummy load means, second switching means for alternatively connecting said constant current source to said dummy load means or to said first mentioned switching means, and means connected to said switching means for activating said switching means.

4. Apparatus as defined in claim 2 in which the switching means includes first, second, third, and fourth switches connected to form a switching bridge, the force producing means being connected across one diagonal of said switching bridge and the means for supplying energization pulses being connected across another diagonal of said switching bridge.

5. Apparatus as defined in claim 4 in which the means for selectively energizing said switching means includes a bistable means having first and second output means maintained in respectively opposite signal conditions, means connecting said first output means to a first pair of switches of the switching bridge whereby said first pair of switches is energized when said bistable means is in a first state and further connecting said second output means to a second pair of switches of the switching bridge whereby said second pair of switches is energized when said bistable means is in a second state, and means connected to said bistable means for reversing the state thereof.

6. Apparatus for controlling a movable member having reversible force producing means attached thereto capable of moving said member relative to a null position comprising, in combination: a constant current supply; switching means for periodically connecting said current supply to said force producing means of said member to form pulses of substantially constant energy content; and control means connected to said switching means for switching said switching means to a first condition so that pulses are applied to said force producing means only in a first sense to move said member in one direction toward null, to a second condition so that pulses are applied to said force producing means only in a second sense to move said member in the other direction toward null, or alternately to said first condition and then to said second condition to maintain said member approximately at the null position; a dummy load; and means for connecting said dummy load to said constant current supply except when said switching means is connecting said constant current supply to said force producing means.

7. Apparatus for digitally rebalancing an inertial sensor comprising, in combination: force generating means positioned in operable relationship to a movable member of said intertial sensor for producing movement of said movable member when said force generating means is energized; a pulse source for producing pulses having a substantially constant quantity of electrical energy in each pulse; first switching means for connecting said pulse source to said force generating means in a first sense; second switching means for connecting said pulse source to said force generating means in a second sense; means for activating said first and second switching means to connect said pulse source to said force generating means only in the first sense when a first direction of movement of said movable member is desired, only in a second sense when a second direction of movement of a movable member is desired, and alternately in the first and second sense when substantially no movement of said movable member is desired.

8. Apparatus as defined in claim 7 in which the first switching means includes first and second switches and the second switching means includes third and fourth swtiches and means connecting said first, second, third and fourth switches to form a switching bridge, the force producing means being connected across one diagonal of said switching bridge and the means for supplying energization pulses being connected across another diagonal of said switching bridge.

References Cited

UNITED STATES PATENTS

| 2,533,695 | 12/1950 | Schrieber | 318—129 |
| 2,753,505 | 7/1956 | Larew et al. | 318—28 |
| 2,888,622 | 5/1959 | Mooers | 318—293 |
| 2,907,213 | 10/1959 | Wendt | 74—5.47 |
| 2,990,505 | 6/1961 | Ketchledge | 318—281 |
| 3,004,199 | 10/1961 | Sakson | 318—28 |
| 3,078,404 | 2/1963 | Dumaire | 318—162 |
| 3,079,539 | 2/1963 | Guerth | 318—28 |
| 3,110,851 | 11/1963 | Plogstedt et al. | 318—29 |
| 3,176,143 | 3/1965 | Lode | 307—41 |

BENJAMIN DOBECK, *Primary Examiner.*